(12) United States Patent
Yang et al.

(10) Patent No.: US 10,305,374 B2
(45) Date of Patent: May 28, 2019

(54) POWER SUPPLYING CIRCUIT AND LIQUID CRYSTAL DISPLAY

(71) Applicant: SHENZHEN CHINA STAR OPTOELECTRONICS TECHNOLOGY CO., LTD., Shenzhen, Guangdong (CN)

(72) Inventors: Yong Yang, Shenzhen (CN); Fangyun Liu, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/567,527

(22) PCT Filed: Mar. 17, 2017

(86) PCT No.: PCT/CN2017/077092
§ 371 (c)(1),
(2) Date: Oct. 18, 2017

(87) PCT Pub. No.: WO2018/152901
PCT Pub. Date: Aug. 30, 2018

(65) Prior Publication Data
US 2018/0294713 A1  Oct. 11, 2018

(30) Foreign Application Priority Data

Feb. 24, 2017 (CN) .......................... 2017 1 0103711

(51) Int. Cl.
*H02M 1/32* (2007.01)
*H02M 1/42* (2007.01)
(Continued)

(52) U.S. Cl.
CPC .......... *H02M 1/4241* (2013.01); *H02M 1/42* (2013.01); *H02M 1/4266* (2013.01);
(Continued)

(58) Field of Classification Search
CPC .... H02M 1/4241; H02M 1/32; H02M 1/4266; H02M 7/04
(Continued)

(56) References Cited

U.S. PATENT DOCUMENTS 9,893,627 B1 * 2/2018 Telefus ................ H02M 3/158
2008/0198638 A1 * 8/2008 Reinberger ......... H02M 3/3376
363/74
(Continued)

FOREIGN PATENT DOCUMENTS

CN  101247072 A  8/2008
CN  203574559 U  4/2014
(Continued)

*Primary Examiner* — Thienvu V Tran
*Assistant Examiner* — Brian K Baxter
(74) *Attorney, Agent, or Firm* — Hauptman Ham, LLP

(57) ABSTRACT

A power supplying circuit includes a rectifier, a flyback converter, a power factor correction circuit, an LLC resonant converter, a power factor correction (PFC) controller, and a LLC resonant controller. The PFC controller is configured to supply a first operating voltage to the PFC circuit. The LLC resonant controller is configured to supply a second operating voltage to the LLC resonant converter upon a condition that a voltage applied on the output terminal of the PFC circuit reaches a predetermined voltage.

18 Claims, 5 Drawing Sheets

(51) Int. Cl.
 *H02M 3/335* (2006.01)
 *H02M 7/04* (2006.01)
 *H02M 1/00* (2006.01)

(52) U.S. Cl.
 CPC .............. *H02M 3/335* (2013.01); *H02M 1/32* (2013.01); *H02M 7/04* (2013.01); *H02M 2001/007* (2013.01); *Y02B 70/126* (2013.01)

(58) Field of Classification Search
 USPC ........................................................ 307/154
 See application file for complete search history.

(56) References Cited

U.S. PATENT DOCUMENTS

| | | | | |
|---|---|---|---|---|
| 2009/0091957 A1* | 4/2009 | Orr | ..................... | H02M 1/4225 363/79 |
| 2014/0268905 A1* | 9/2014 | Reddy | .................. | H02M 1/4225 363/21.02 |
| 2014/0307483 A1* | 10/2014 | Sigamani | .......... | H02M 3/33546 363/21.02 |
| 2015/0198634 A1* | 7/2015 | Brinlee | .................. | G01R 31/28 324/72.5 |
| 2015/0349624 A1 | 12/2015 | Wang et al. | | |
| 2016/0141951 A1* | 5/2016 | Mao | ......................... | H02M 1/36 363/21.02 |
| 2016/0254742 A1 | 9/2016 | Krumpholz | | |
| 2017/0126134 A1* | 5/2017 | Young | ..................... | H02M 1/44 |
| 2017/0310224 A1* | 10/2017 | Joo | ..................... | H02M 3/33507 |

FOREIGN PATENT DOCUMENTS

| | | |
|---|---|---|
| CN | 203645381 U | 6/2014 |
| CN | 103997226 A | 8/2014 |
| CN | 204906165 U | 12/2015 |

* cited by examiner

POWER SUPPLYING CIRCUIT AND LIQUID CRYSTAL DISPLAY

CROSS REFERENCE TO RELATED APPLICATION

This present application is a national stage filing under 35 U.S.C § 371 of PCT application number PCT/CN2017/077092 filed on Mar. 17, 2017 which is based upon and claims the benefit of priority to Chinese Patent Application No. 201710103711.5 filed on Feb. 24, 2017 in the State Intellectual Property Office of the P.R.C. The disclosures of the above-listed applications are hereby incorporated by reference herein in their entirety.

BACKGROUND

1. Field of the Disclosure

The present disclosure relates to the technical field of liquid crystal display (LCD) television, and more particularly, to a power supplying circuit and an LCD.

2. Description of the Related Art

Flat display devices, such as liquid crystal displays (LCDs) have advantages of high-definition, energy-saving, thin body, wide applied field, and so on, so they are widely applied to various kinds of consumer electronics products. LCD televisions become the popular display devices.

Please refer to FIG. 1 illustrating a block diagram of a conventional power supplying circuit. The conventional power supplying circuit includes a rectifier 101, a flyback converter 102, a power factor correction (PFC) circuit 103, and an LLC resonant converter 104. The flyback convertor 102 is configured to supply power to a main board or a control board, as well as the PFC circuit 103 and LLC resonant converter 104. When the flyback converter 102 supplies power to the PFC circuit 103 and LLC resonant converter 104, the PFC circuit 103 and LLC resonant converter 104 operate. The PFC converter 103 outputs a voltage to the LLC resonant converter 104 to generate a load voltage. However, if the LLC resonant converter 104 enables before PFC converter 103 supplies steady voltage to the LLC resonant converter 104, over current may flow through switches of the LLC resonant converter 104, causing the switches burn-out and malfunction.

Therefore, it is necessary to provide a power supplying circuit and a liquid crystal display to solve the defect of the conventional power supplying circuit.

SUMMARY

An object of the present disclosure is to propose a power supplying circuit and a liquid crystal display (LCD) to prevent a transistor device in an LLC resonant converter is damaged, a cause of ineffectiveness of a conventional power supplying circuit, once the LLC resonant converter starts to work before the output voltage applied on a power factor correction circuit (PFC circuit) in the conventional power supplying circuit reaches a stable value.

According to the present disclosure, a power supplying circuit comprises a rectifier, a flyback converter, a power factor correction circuit, an LLC resonant converter, a power factor correction (PFC) controller, and a LLC resonant controller.

An first input terminal, a second terminal, and a control terminal of the power factor correction controller connect to a first output terminal and second terminal of the flyback converter and a first input terminal of the LLC resonant controller, respectively.

A second input terminal of the LLC resonant controller is connected to a first output terminal of the flyback converter, an output terminal of the LLC resonant controller is coupled to the LLC resonant converter, a collecting terminal of the LLC resonant controller is coupled to an output terminal of the PFC controller.

The PFC controller is configured to supply a first operating voltage to the PFC circuit. The LLC resonant controller is configured to supply a second operating voltage to the LLC resonant converter upon a condition that a voltage applied on the output terminal of the PFC circuit reaches a predetermined voltage.

The PFC controller comprises a first photo-coupler, a first transistor, a second transistor, a control signal processing circuit, a voltage divider, and a clamping circuit.

The anode of the first photo-coupler is coupled to the first output terminal of the flyback converter. The cathode of the first photo-coupler is coupled to a first terminal of the first transistor. A second terminal of the first transistor is grounded; a control terminal of the first transistor is coupled to the control signal processing circuit.

A collector of the first photo-coupler is coupled to a second terminal of the flyback converter. An emitter of the first photo-coupler is coupled to a control terminal of the second transistor and the clamping circuit through the voltage divider.

A first terminal of the second transistor is coupled to the second terminal of the flyback converter. A second terminal of the second transistor is coupled to the PFC circuit and the first input terminal of the LLC resonant controller.

The control signal processing circuit comprises a first resistor, a second resistor, and a first capacitor. One terminal of the first resistor is coupled to a control signal source. The other terminal of the first resistor is coupled to one terminal of the second resistor, one terminal of the first capacitor, and the control terminal of the first transistor. The other terminal of the second resistor and the other terminal of the first capacitor are grounded.

The voltage divider comprises a third resistor and a fourth resistor. One terminal of the third resistor and one terminal of the fourth resistor are coupled to the emitter of the first photo-coupler. The other terminal of the third resistor is grounded. The other terminal of the fourth resistor is coupled to the control terminal of the second transistor.

The clamping circuit comprises a Zener diode, a first diode, and a second capacitor. One terminal of the Zener diode, one terminal of the second capacitor, and a cathode of the first diode are coupled to the control terminal of the second transistor. The other terminal of the Zener diode and the other terminal of the second capacitor are grounded. An anode of the first diode is coupled to a second terminal of the second transistor.

The LLC resonant controller comprises a second photo-coupler, a controllable voltage supplier, a third transistor, and a collecting circuit.

An anode of the second photo-coupler is coupled to one terminal of a fifth resistor and one terminal of a sixth resistor. The other terminal of the fifth resistor is coupled to the PFC controller. The other terminal of the sixth resistor is coupled to a cathode of the second photo-coupler and an anode of the controllable voltage supplier. A cathode of the controllable voltage supplier is grounded. A reference terminal of the controllable voltage supplier is coupled to the voltage output terminal of the PFC circuit.

The collector of the second photo-coupler is coupled to one terminal of a seventh resistor and one terminal of an eighth resistor. The other terminal of the seventh resistor is coupled to the first output terminal of the flyback converter. The other terminal of the eighth resistor is coupled to a control terminal of the third transistor. An emitter of the second photo-coupler is grounded.

A first terminal of the third transistor is coupled to one terminal of the ninth resistor. The other terminal of the ninth resistor is coupled to the first output terminal of the flyback converter. A second terminal of the third transistor is coupled to the LLC resonant converter.

The collecting circuit is configured to collect the voltage applied on the voltage output terminal of the PFC circuit to the reference terminal of the controllable voltage supplier.

Furthermore, the PFC controller further comprises a third capacitor. One terminal of the third capacitor is coupled to the PFC circuit. The other terminal of the third capacitor is grounded.

Furthermore, the first transistor and the second transistor are NPN transistors. A first terminal, a second terminal, and a control terminal of the first transistor are a collector, an emitter, and a base, respectively. A first terminal, a second terminal, and a control terminal of the second transistor are a collector, an emitter, and a base, respectively.

Furthermore, the third transistor is a PNP transistor. A first terminal, a second terminal, and a control terminal of the third transistor are an emitter, a collector, and a base, respectively.

Furthermore, the collecting circuit comprises a tenth resistor, an eleventh resistor, and a twelfth resistor.

One terminal of the tenth resistor is coupled to the voltage output terminal of the PFC circuit. The other terminal of the tenth resistor is coupled to one terminal of the eleventh resistor. The other terminal of the eleventh resistor and one terminal of the twelfth resistor are coupled to the reference terminal of the controllable voltage supplier. The other terminal of the twelfth resistor is grounded.

Furthermore, the collecting circuit comprises a thirteenth resistor, a fourteenth resistor, and a fifteenth resistor, a second diode, a third diode, a fourth capacitor, and a fifth capacitor.

One terminal of the thirteenth resistor is coupled to the voltage output terminal of the PFC circuit. The other terminal of the thirteenth resistor is coupled to one terminal of the fourth capacitor. The other terminal of the fourth capacitor and an anode of the second diode are coupled to a cathode of the third diode.

A cathode of the second diode is coupled to one terminal of the fifth capacitor and one terminal of the fourteenth resistor. An anode of the third diode and the other terminal of the fifth capacitor are grounded.

The other terminal of the fourteenth resistor and one terminal of the fifteenth resistor are coupled to the reference terminal of the controllable voltage supplier. The other terminal of the fifteenth resistor is grounded.

Furthermore, the LLC resonant controller further comprises a sixth capacitor. One terminal of the sixth capacitor is coupled to the reference terminal of the controllable voltage supplier. The other terminal of the sixth capacitor is grounded.

According to the present disclosure, a power supplying circuit comprises a rectifier, a flyback converter, a power factor correction circuit, an LLC resonant converter, a power factor correction (PFC) controller, and a LLC resonant controller.

An first input terminal, a second terminal, and a control terminal of the power factor correction controller connect to a first output terminal and second terminal of the flyback converter and a first input terminal of the LLC resonant controller, respectively.

A second input terminal of the LLC resonant controller is connected to a first output terminal of the flyback converter, an output terminal of the LLC resonant controller is coupled to the LLC resonant converter, a collecting terminal of the LLC resonant controller is coupled to an output terminal of the PFC controller.

The PFC controller is configured to supply a first operating voltage to the PFC circuit. The LLC resonant controller is configured to supply a second operating voltage to the LLC resonant converter upon a condition that a voltage applied on the output terminal of the PFC circuit reaches a predetermined voltage.

Furthermore, the PFC controller comprises a first photo-coupler, a first transistor, a second transistor, a control signal processing circuit, a voltage divider, and a clamping circuit.

The anode of the first photo-coupler is coupled to the first output terminal of the flyback converter. The cathode of the first photo-coupler is coupled to a first terminal of the first transistor. A second terminal of the first transistor is grounded. A control terminal of the first transistor is coupled to the control signal processing circuit.

A collector of the first photo-coupler is coupled to a second terminal of the flyback converter. An emitter of the first photo-coupler is coupled to a control terminal of the second transistor and the clamping circuit through the voltage divider.

A first terminal of the second transistor is coupled to the second terminal of the flyback converter. A second terminal of the second transistor is coupled to the PFC circuit and the first input terminal of the LLC resonant controller.

The control signal processing circuit comprises a first resistor, a second resistor, and a first capacitor. One terminal of the first resistor is coupled to a control signal source. The other terminal of the first resistor is coupled to one terminal of the second resistor, one terminal of the first capacitor, and the control terminal of the first transistor. The other terminal of the second resistor and the other terminal of the first capacitor are grounded.

The voltage divider comprises a third resistor and a fourth resistor. One terminal of the third resistor and one terminal of the fourth resistor are coupled to the emitter of the first photo-coupler. The other terminal of the third resistor is grounded. The other terminal of the fourth resistor is coupled to the control terminal of the second transistor.

The clamping circuit comprises a Zener diode, a first diode, and a second capacitor. One terminal of the Zener diode, one terminal of the second capacitor, and a cathode of the first diode are coupled to the control terminal of the second transistor. The other terminal of the Zener diode and the other terminal of the second capacitor are grounded. An anode of the first diode is coupled to a second terminal of the second transistor.

Furthermore, the PFC controller further comprises a third capacitor. One terminal of the third capacitor is coupled to the PFC circuit. The other terminal of the third capacitor is grounded.

Furthermore, the first transistor and the second transistor are NPN transistors. A first terminal, a second terminal, and a control terminal of the first transistor are a collector, an emitter, and a base, respectively. A first terminal, a second terminal, and a control terminal of the second transistor are a collector, an emitter, and a base, respectively.

Furthermore, the LLC resonant controller comprises a second photo-coupler, a controllable voltage supplier, a third transistor, and a collecting circuit.

An anode of the second photo-coupler is coupled to one terminal of a fifth resistor and one terminal of a sixth resistor. The other terminal of the fifth resistor is coupled to the PFC controller. The other terminal of the sixth resistor is coupled to a cathode of the second photo-coupler and an anode of the controllable voltage supplier. A cathode of the controllable voltage supplier is grounded. A reference terminal of the controllable voltage supplier is coupled to the voltage output terminal of the PFC circuit.

The collector of the second photo-coupler is coupled to one terminal of a seventh resistor and one terminal of an eighth resistor. The other terminal of the seventh resistor is coupled to the first output terminal of the flyback converter. The other terminal of the eighth resistor is coupled to a control terminal of the third transistor. An emitter of the second photo-coupler is grounded.

A first terminal of the third transistor is coupled to one terminal of the ninth resistor. The other terminal of the ninth resistor is coupled to the first output terminal of the flyback converter. A second terminal of the third transistor is coupled to the LLC resonant converter.

The collecting circuit is configured to collect the voltage applied on the voltage output terminal of the PFC circuit to the reference terminal of the controllable voltage supplier.

Furthermore, the third transistor is a PNP transistor. A first terminal, a second terminal, and a control terminal of the third transistor are an emitter, a collector, and a base, respectively.

Furthermore, the collecting circuit comprises a tenth resistor, an eleventh resistor, and a twelfth resistor.

One terminal of the tenth resistor is coupled to the voltage output terminal of the PFC circuit. The other terminal of the tenth resistor is coupled to one terminal of the eleventh resistor. The other terminal of the eleventh resistor and one terminal of the twelfth resistor are coupled to the reference terminal of the controllable voltage supplier. The other terminal of the twelfth resistor is grounded.

Furthermore, the collecting circuit comprises a thirteenth resistor, a fourteenth resistor, and a fifteenth resistor, a second diode, a third diode, a fourth capacitor, and a fifth capacitor.

One terminal of the thirteenth resistor is coupled to the voltage output terminal of the PFC circuit. The other terminal of the thirteenth resistor is coupled to one terminal of the fourth capacitor. The other terminal of the fourth capacitor and an anode of the second diode are coupled to a cathode of the third diode.

A cathode of the second diode is coupled to one terminal of the fifth capacitor and one terminal of the fourteenth resistor. An anode of the third diode and the other terminal of the fifth capacitor are grounded.

The other terminal of the fourteenth resistor and one terminal of the fifteenth resistor are coupled to the reference terminal of the controllable voltage supplier. The other terminal of the fifteenth resistor is grounded.

Furthermore, the LLC resonant controller further comprises a sixth capacitor. One terminal of the sixth capacitor is coupled to the reference terminal of the controllable voltage supplier. The other terminal of the sixth capacitor is grounded.

According to the present disclosure, a liquid crystal display using a power supplying circuit is provided. The power supplying circuit comprises a rectifier, a flyback converter, a power factor correction circuit, an LLC resonant converter, a power factor correction (PFC) controller, and a LLC resonant controller.

An first input terminal, a second terminal, and a control terminal of the power factor correction controller connect to a first output terminal and second terminal of the flyback converter and a first input terminal of the LLC resonant controller, respectively.

A second input terminal of the LLC resonant controller is connected to a first output terminal of the flyback converter, an output terminal of the LLC resonant controller is coupled to the LLC resonant converter, a collecting terminal of the LLC resonant controller is coupled to an output terminal of the PFC controller.

The PFC controller is configured to supply a first operating voltage to the PFC circuit. The LLC resonant controller is configured to supply a second operating voltage to the LLC resonant converter upon a condition that a voltage applied on the output terminal of the PFC circuit reaches a predetermined voltage.

Furthermore, the PFC controller comprises a first photo-coupler, a first transistor, a second transistor, a control signal processing circuit, a voltage divider, and a clamping circuit.

The anode of the first photo-coupler is coupled to the first output terminal of the flyback converter. The cathode of the first photo-coupler is coupled to a first terminal of the first transistor. A second terminal of the first transistor is grounded. A control terminal of the first transistor is coupled to the control signal processing circuit.

A collector of the first photo-coupler is coupled to a second terminal of the flyback converter. An emitter of the first photo-coupler is coupled to a control terminal of the second transistor and the clamping circuit through the voltage divider.

A first terminal of the second transistor is coupled to the second terminal of the flyback converter. A second terminal of the second transistor is coupled to the PFC circuit and the first input terminal of the LLC resonant controller.

The control signal processing circuit comprises a first resistor, a second resistor, and a first capacitor. One terminal of the first resistor is coupled to a control signal source. The other terminal of the first resistor is coupled to one terminal of the second resistor, one terminal of the first capacitor, and the control terminal of the first transistor. The other terminal of the second resistor and the other terminal of the first capacitor are grounded.

The voltage divider comprises a third resistor and a fourth resistor. One terminal of the third resistor and one terminal of the fourth resistor are coupled to the emitter of the first photo-coupler. The other terminal of the third resistor is grounded. The other terminal of the fourth resistor is coupled to the control terminal of the second transistor.

The clamping circuit comprises a Zener diode, a first diode, and a second capacitor. One terminal of the Zener diode, one terminal of the second capacitor, and a cathode of the first diode are coupled to the control terminal of the second transistor. The other terminal of the Zener diode and the other terminal of the second capacitor are grounded. An anode of the first diode is coupled to a second terminal of the second transistor.

Furthermore, the LLC resonant controller comprises a second photo-coupler, a controllable voltage supplier, a third transistor, and a collecting circuit.

An anode of the second photo-coupler is coupled to one terminal of a fifth resistor and one terminal of a sixth resistor. The other terminal of the fifth resistor is coupled to the PFC controller. The other terminal of the sixth resistor is coupled to a cathode of the second photo-coupler and an anode of the controllable voltage supplier. A cathode of the controllable voltage supplier is grounded. A reference terminal of the controllable voltage supplier is coupled to the voltage output terminal of the PFC circuit.

The collector of the second photo-coupler is coupled to one terminal of a seventh resistor and one terminal of an eighth resistor. The other terminal of the seventh resistor is coupled to the first output terminal of the flyback converter. The other terminal of the eighth resistor is coupled to a control terminal of the third transistor. An emitter of the second photo-coupler is grounded.

A first terminal of the third transistor is coupled to one terminal of the ninth resistor. The other terminal of the ninth resistor is coupled to the first output terminal of the flyback converter. A second terminal of the third transistor is coupled to the LLC resonant converter.

The collecting circuit is configured to collect the voltage applied on the voltage output terminal of the PFC circuit to the reference terminal of the controllable voltage supplier.

Furthermore, the third transistor is a PNP transistor. A first terminal, a second terminal, and a control terminal of the third transistor are an emitter, a collector, and a base, respectively.

In the present disclosure, a PFC controller and an LLC resonant controller are arranged in a power supplying circuit and an LCD. Firstly, a first operating voltage is supplied with the PFC controller to the PFC converter to further output a voltage to the LLC resonant converter. Secondly, a second operating voltage is supplied with the LLC resonant controller to the LLC resonant converter upon a condition that a voltage applied on the output terminal of the PFC circuit reaches a predetermined voltage. In this way, a transistor device in the LLC resonant converter protects against damage effectively, and correspondingly, the reliability of a power supplying circuit increases.

These and other features, aspects and advantages of the present disclosure will become understood with reference to the following description, appended claims and accompanying figures.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF THE PREFERRED EMBODIMENTS

For better understanding embodiments of the present invention, the following detailed description taken in conjunction with the accompanying drawings is provided. Apparently, the accompanying drawings are merely for some of the embodiments of the present invention. Any ordinarily skilled person in the technical field of the present invention could still obtain other accompanying drawings without use laborious invention based on the present accompanying drawings.

Figure 1:
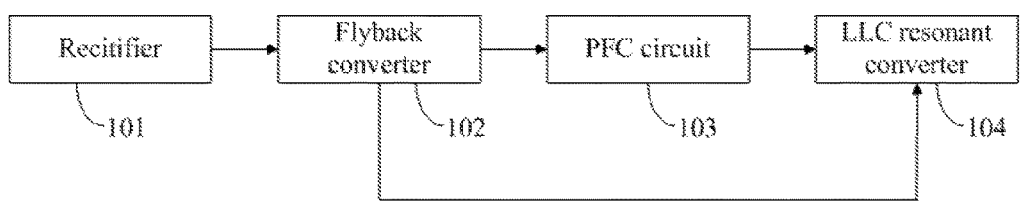
FIG. 1 illustrates a block diagram of a conventional power supplying circuit.
Figure 2:
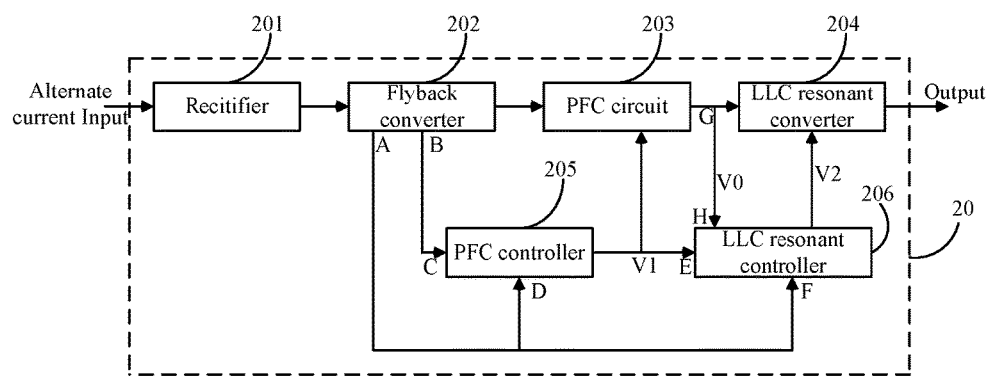
FIG. 2 illustrates a block diagram of a power supplying circuit according to a preferred embodiment of the present disclosure.

Referring to FIG. 2 illustrating a block diagram of a power supplying circuit according to a preferred embodiment of the present disclosure, the power supplying circuit 20 comprises a rectifier 201, a flyback converter 202, a power factor correction (PFC) circuit 203, an LLC resonant converter 204, a power factor correction (PFC) controller 205, and a LLC resonant controller 206.

An first input terminal D, a second terminal C, and an output terminal of the power factor correction controller 205 connect to a first output terminal A and second terminal B of the flyback converter 202 and a first input terminal E of the LLC resonant controller 206, respectively. A second input terminal F of the LLC resonant controller 206 is connected to a first output terminal A of the flyback converter 202, an output terminal of the LLC resonant controller 206 is coupled to the LLC resonant converter 204, a collecting terminal H of the LLC resonant controller 206 is coupled to an output terminal G of the PFC controller 205.

Specifically, the PFC controller 205 is configured to supply a steady first operating voltage V1 to the PFC circuit 203. The LLC resonant controller 206 is configured to supply a second operating voltage V2 to the LLC resonant converter 204 upon a condition that a voltage V0 applied on the output terminal G of the PFC circuit 203 reaches a predetermined voltage. In this way, a switch device in the LLC resonant converter 204 protects against damage effectively, and correspondingly, the reliability of a power supplying circuit 20 increases.

Figure 3:
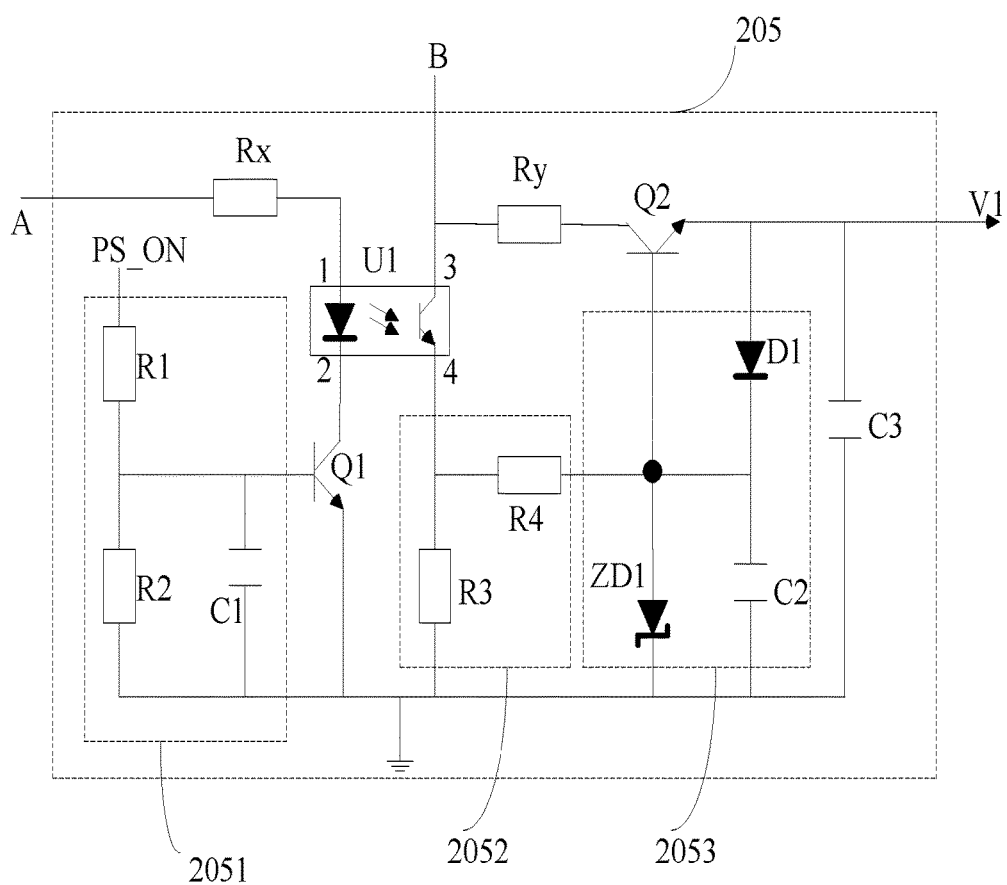
FIG. 3 illustrates a circuit diagram of a PFC controller of a power supplying circuit according to a preferred embodiment of the present disclosure.

Referring to FIG. 3 illustrating a circuit diagram of a PFC controller of a power supplying circuit according to a preferred embodiment of the present disclosure, the PFC controller 205 includes a first photo-coupler U1, a first transistor Q1, a second transistor Q2, a control signal processing circuit 2051, a voltage divider 2052, and a clamping circuit 2053.

An anode 1 of the first photo-coupler U1 is coupled to the first output terminal A of the flyback converter 202 through a protection resistor Rx. A cathode 2 of the first photo-coupler U1 is coupled to a first terminal of the first transistor Q1. A second terminal of the first transistor Q1 is grounded. A control terminal of the first transistor Q1 is coupled to the control signal processing circuit 2051.

A collector 3 of the first photo-coupler U1 is coupled to a second terminal B of the flyback converter 202. An emitter 4 of the first photo-coupler U1 is coupled to a control terminal of the second transistor Q2 and the clamping circuit 2053 through the voltage divider 2052.

A first terminal of the second transistor Q2 is coupled to the second terminal of the flyback converter 202 through a protection resistor Ry. A second terminal of the second transistor Q2 is coupled to the PFC circuit 203 and the first input terminal E of the LLC resonant controller 206.

The control signal processing circuit 2051 includes a first resistor R1, a second resistor R2, and a first capacitor C1. One terminal of the first resistor R1 is coupled to a control signal source PS_ON. The other terminal of the first resistor R1 is coupled to one terminal of the second resistor R2, one terminal of the first capacitor R1, and the control terminal of the first transistor Q1. The other terminal of the second resistor R2 and the other terminal of the first capacitor C1 are grounded.

The voltage divider 2052 comprises a third resistor R3 and a fourth resistor R4. One terminal of the third resistor R3 and one terminal of the fourth resistor R4 are coupled to the emitter of the first photo-coupler U1. The other terminal of the third resistor R3 is grounded. The other terminal of the fourth resistor R4 is coupled to the control terminal of the second transistor Q2.

The clamping circuit 2053 comprises a Zener diode ZD1, a first diode D1, and a second capacitor C2. One terminal of the Zener diode ZD1, one terminal of the second capacitor C2, and a cathode of the first diode D1 are coupled to the control terminal of the second transistor Q2. The other terminal of the Zener diode ZD1 and the other terminal of the second capacitor C2 are grounded. An anode of the first diode D1 is coupled to a second terminal of the second transistor Q2.

Furthermore, the PFC controller 205 further comprises a third capacitor C3. One terminal of the third capacitor C3 is coupled to the PFC circuit 203. The other terminal of the third capacitor C3 is grounded. Preferably, the first transistor Q1 and the second transistor Q2 are NPN transistors. A first terminal, a second terminal, and a control terminal of the first transistor Q1 are a collector, an emitter, and a base, respectively. A first terminal, a second terminal, and a control terminal of the second transistor Q2 are a collector, an emitter, and a base, respectively.

Operation of the PFC controller is introduced as follows: The flyback converter 202 outputs voltage at the first output terminal A. When a control signal from the control signal source PS_ON is fed to the control terminal of the first transistor Q1 through the control signal processing circuit 2051, the first transistor Q1 turns on to conduct the anode 1 and the cathode 2 of the first photo-coupler U1, thereby conducting the collector 3 and emitter 4 of the first photo-coupler U1. Therefore, the clamping circuit 2053 clamps the first operating voltage V1 to the PFC circuit 203. Specifically, upon a condition that the voltage at the second output terminal B of the flyback converter 202 is lower than the zenor voltage of the zenor diode ZD1, the second transistor Q2 turns on while the diode D1 is turned off. At this moment, the voltage at the second terminal B of the flyback converter 202 is fed to the PFC circuit 203 via the second transistor Q2, so that the PFC circuit 203 works. Upon a condition that the voltage at the second output terminal B of the flyback converter 202 is higher than the zenor voltage of the zenor diode ZD1, the second transistor Q2 turns on while the diode D1 is turned on. At this moment, the voltage at the second terminal B of the flyback converter 202 is clamped to the zenor voltage of the zenor diode ZD1 via the second transistor Q2. By using the PFC controller of the present disclosure, the first operating voltage of the PFC circuit is more stable, raising the reliability of a power supplying circuit.

Figure 4:
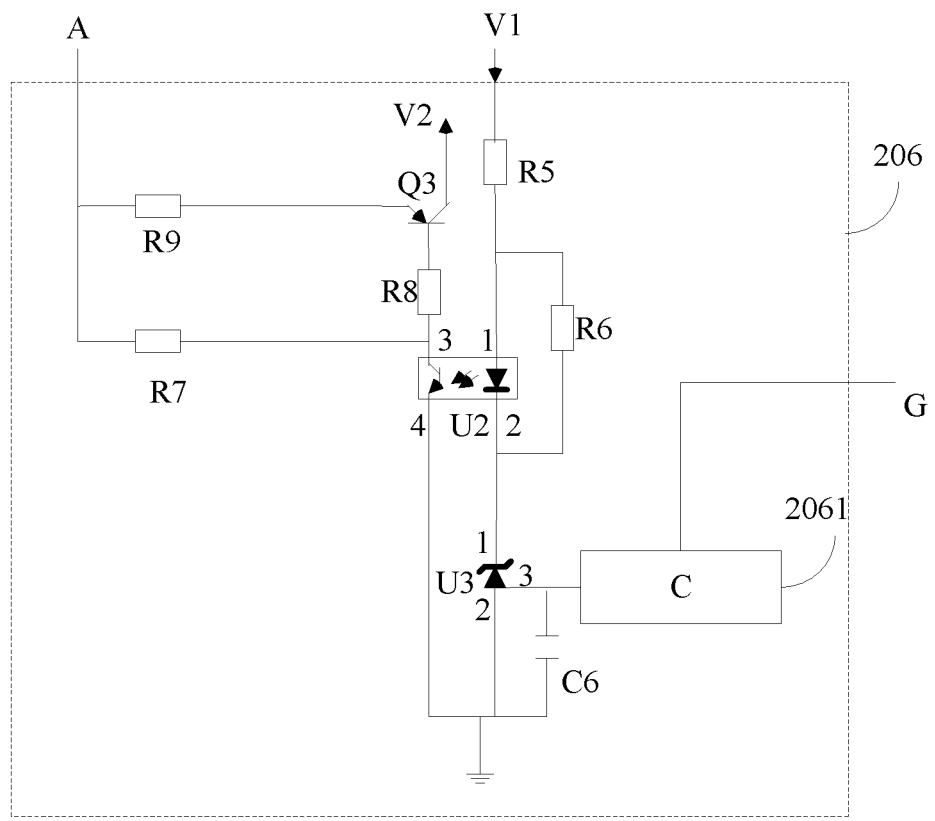
FIG. 4 illustrating a circuit diagram of an LLC resonant controller according to an embodiment of the present disclosure.

Please refer to FIG. 4 illustrating a circuit diagram of an LLC resonant controller 206 according to an embodiment of the present disclosure. The LLC resonant controller 206 includes a second photo-coupler U2, a controllable voltage supplier U3, a third transistor Q3, and a collecting circuit 2061.

An anode 1 of the second photo-coupler U2 is coupled to one terminal of a fifth resistor R5 and one terminal of a sixth resistor R6. The other terminal of the fifth resistor R5 is coupled to the PFC controller 205. The other terminal of the sixth resistor R6 is coupled to a cathode 2 of the second photo-coupler U2 and an anode 2 of the controllable voltage supplier U3. A cathode 2 of the controllable voltage supplier U3 is grounded. A reference terminal 3 of the controllable voltage supplier U3 is coupled to the voltage output terminal G of the PFC circuit 203 via the collecting circuit 2061.

The collector 3 of the second photo-coupler U2 is coupled to one terminal of a seventh resistor R7 and one terminal of an eighth resistor R8. The other terminal of the seventh resistor R7 is coupled to the first output terminal A of the flyback converter 202. The other terminal of the eighth resistor R8 is coupled to a control terminal of the third transistor Q3. An emitter 4 of the second photo-coupler U2 is grounded.

A first terminal of the third transistor Q3 is coupled to one terminal of the ninth resistor R9. The other terminal of the ninth resistor R9 is coupled to the first output terminal A of the flyback converter 202. A second terminal of the third transistor Q3 is coupled to the LLC resonant converter 204.

The collecting circuit 2061 is configured to collect the voltage applied on the voltage output terminal G of the PFC circuit 203 to the reference terminal 3 of the controllable voltage supplier U3.

Preferably, the third transistor is a PNP transistor. A first terminal, a second terminal, and a control terminal of the third transistor Q3 are an emitter, a collector, and a base, respectively. The LLC resonant controller further includes a sixth capacitor C6. One terminal of the sixth capacitor C6 is coupled to the reference terminal 3 of the controllable voltage supplier U3. The other terminal of the sixth capacitor C6 is grounded.

Figure 5:
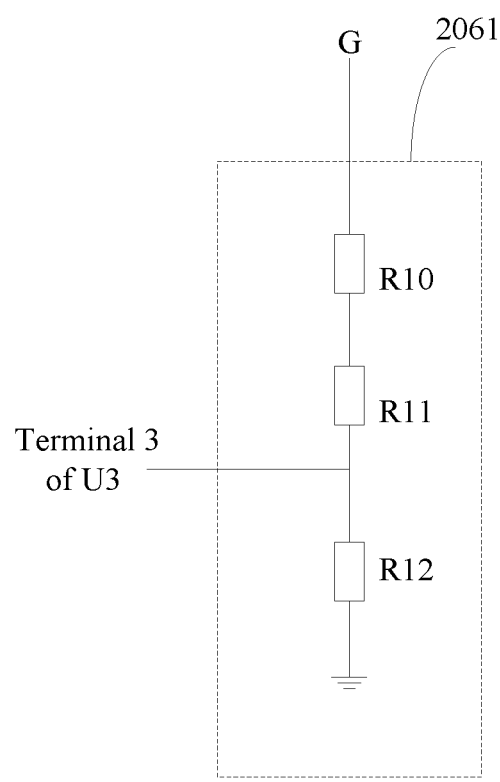
FIG. 5 illustrates a circuit diagram of the collecting circuit of the LLC resonant controller according to a first embodiment of the present disclosure.

Please refer to FIG. 5 illustrating a circuit diagram of the collecting circuit of the LLC resonant controller according to a first embodiment of the present disclosure. The collecting circuit 2061 is configured to detect whether the voltage at the voltage output terminal of the PFC circuit meets a predetermined voltage. The collecting circuit 2061 includes a tenth resistor R10, an eleventh resistor R11, and a twelfth resistor R12.

One terminal of the tenth resistor R10 is coupled to the voltage output terminal G of the PFC circuit. The other terminal of the tenth resistor R10 is coupled to one terminal of the eleventh resistor R11. The other terminal of the eleventh resistor R11 and one terminal of the twelfth resistor R12 are coupled to the reference terminal 3 of the controllable voltage supplier U3. The other terminal of the twelfth resistor R12 is grounded.

Figure 6:
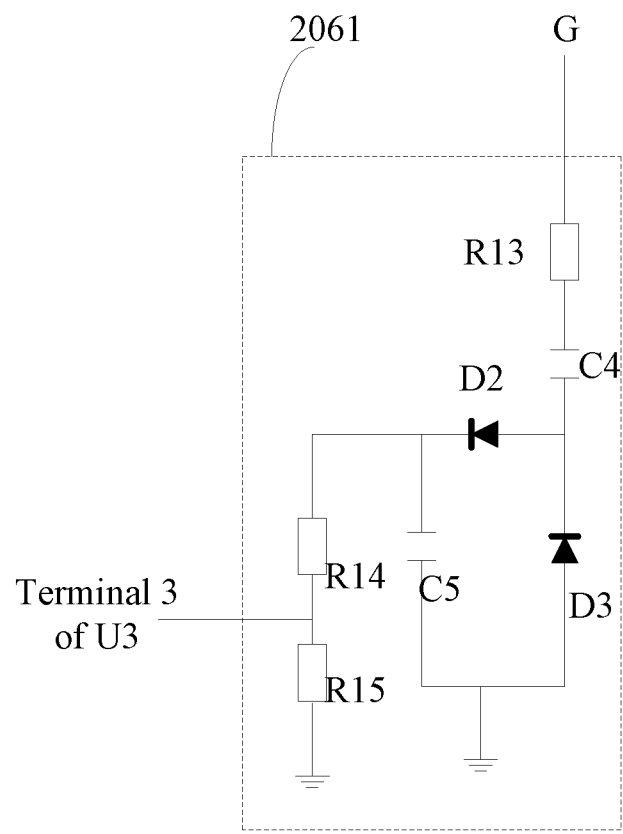
FIG. 6 illustrates a circuit diagram of the collecting circuit of the LLC resonant controller according to a second embodiment of the present disclosure.

Please refer to FIG. 6 illustrating a circuit diagram of the collecting circuit of the LLC resonant controller according to a second embodiment of the present disclosure. The collecting circuit 2061 is configured to detect whether the voltage at the voltage output terminal of the PFC circuit meets a predetermined voltage. It is noted that the PFC circuit 203 may output voltage with a specific ratio by means of a transformer. The output voltage of the PFC circuit 203 illustrated in FIG. 6 is proportional to that of the PFC circuit 203 illustrated in FIG. 5. The one skilled in the art can arrange the collecting circuit depending on the proportional output voltage of the PFC circuit 203. The collecting circuit includes a thirteenth resistor R13, a fourteenth resistor R14, and a fifteenth resistor R15, a second diode D2, a third diode D3, a fourth capacitor C4, and a fifth capacitor C5.

One terminal of the thirteenth resistor R13 is coupled to the voltage output terminal G of the PFC circuit. The other terminal of the thirteenth resistor R13 is coupled to one terminal of the fourth capacitor C4. The other terminal of the fourth capacitor C4 and an anode of the second diode D2 are coupled to a cathode of the third diode D3.

A cathode of the second diode D2 is coupled to one terminal of the fifth capacitor C5 and one terminal of the fourteenth resistor R14. An anode of the third diode D3 and the other terminal of the fifth capacitor C5 are grounded.

The other terminal of the fourteenth resistor R14 and one terminal of the fifteenth resistor R15 are coupled to the reference terminal 3 of the controllable voltage supplier U3. The other terminal of the fifteenth resistor R15 is grounded.

Operation of the LLC resonant controller is disclosed as follows: When the PFC circuit outputs a voltage to the LLC resonant converter, the PFC controller controls the collecting circuit to collect the voltage to the reference terminal of the controllable voltage supplier U3. The anode and cathode of the controllable voltage supplier U3 is conducted when the voltage meets a predetermined voltage, so that the first operating voltage output by the PFC controller makes the anode and cathode of the second photo-coupler turn on, thereby conducting the collector and emitter of the second photo-coupler. The voltage output at the first output terminal of the flyback converter makes the collector and emitter of the second photo-coupler form a conduction loop to turn on the third transistor. The voltage output at the first output terminal of the flyback converter is outputted as a second operating voltage to the LLC resonant converter via the first transistor, so that the LLC resonant converter works.

In the present disclosure, the power supplying circuit having a PFC controller and an LLC resonant controller is provided. Firstly, a first operating voltage is supplied with the PFC controller to the PFC converter to further output a voltage to the LLC resonant converter. Secondly, a second operating voltage is supplied with the LLC resonant controller to the LLC resonant converter upon a condition that a voltage applied on the output terminal of the PFC circuit reaches a predetermined voltage. In this way, a transistor device in the LLC resonant converter protects against damage effectively, and correspondingly, the reliability of a power supplying circuit increases.

The present disclosure also proposes a liquid crystal display using a power supplying circuit as provided in the preferred embodiment.

In the present disclosure, the liquid crystal display having a PFC controller and an LLC resonant controller arranged in a power supplying circuit is provided. Firstly, a first operating voltage is supplied with the PFC controller to the PFC converter to further output a voltage to the LLC resonant converter. Secondly, a second operating voltage is supplied with the LLC resonant controller to the LLC resonant converter upon a condition that a voltage applied on the output terminal of the PFC circuit reaches a predetermined voltage. In this way, a transistor device in the LLC resonant converter protects against damage effectively, and correspondingly, the reliability of a power supplying circuit increases.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. A power supplying circuit, comprising a rectifier, a flyback converter, a power factor correction circuit, an LLC resonant converter, a power factor correction (PFC) controller, and a LLC resonant controller, wherein a first input terminal and a second input terminal of the power factor correction controller connect to a first output terminal and second terminal of the flyback converter, respectively, and an output terminal of the power factor correction controller connects to a first input terminal of the LLC resonant controller and the PFC circuit;

a second input terminal of the LLC resonant controller is connected to a first output terminal of the flyback converter, an output terminal of the LLC resonant controller is coupled to the LLC resonant converter, a collecting terminal of the LLC resonant controller is coupled to an output terminal of the PFC controller;

the PFC controller is configured to supply a first operating voltage to a PFC circuit; the LLC resonant controller is configured to supply a second operating voltage to the LLC resonant converter upon a condition that a voltage applied on the output terminal of the PFC circuit reaches a predetermined voltage;

wherein the PFC controller comprises a first photo-coupler, a first transistor, a second transistor, a control signal processing circuit, a voltage divider, and a clamping circuit;

an anode of the first photo-coupler is coupled to the first output terminal of the flyback converter; a cathode of the first photo-coupler is coupled to a first terminal of the first transistor; a second terminal of the first transistor is grounded; a control terminal of the first transistor is coupled to the control signal processing circuit;

a collector of the first photo-coupler is coupled to a second terminal of the flyback converter;

an emitter of the first photo-coupler is coupled to a control terminal of the second transistor and the clamping circuit through the voltage divider;

a first terminal of the second transistor is coupled to the second terminal of the flyback converter; a second terminal of the second transistor is coupled to the PFC circuit and the first input terminal of the LLC resonant controller;

the control signal processing circuit comprises a first resistor, a second resistor, and a first capacitor; one terminal of the first resistor is coupled to a control signal source; the other terminal of the first resistor is coupled to one terminal of the second resistor, one terminal of the first capacitor, and the control terminal of the first transistor; the other terminal of the second resistor and the other terminal of the first capacitor are grounded;

the voltage divider comprises a third resistor and a fourth resistor; one terminal of the third resistor and one terminal of the fourth resistor are coupled to the emitter of the first photo-coupler; the other terminal of the third resistor is grounded; the other terminal of the fourth resistor is coupled to the control terminal of the second transistor;

the clamping circuit comprises a Zener diode, a first diode, and a second capacitor; one terminal of the Zener diode, one terminal of the second capacitor, and a cathode of the first diode are coupled to the control terminal of the second transistor; the other terminal of the Zener diode and the other terminal of the second capacitor are grounded; an anode of the first diode is coupled to a second terminal of the second transistor;

wherein the LLC resonant controller comprises a second photo-coupler, a controllable voltage supplier, a third transistor, and a collecting circuit;

an anode of the second photo-coupler is coupled to one terminal of a fifth resistor and one terminal of a sixth resistor; the other terminal of the fifth resistor is coupled to the PFC controller; the other terminal of the sixth resistor is coupled to a cathode of the second photo-coupler and an anode of the controllable voltage supplier; a cathode of the controllable voltage supplier is grounded; a reference terminal of the controllable voltage supplier is coupled to the voltage output terminal of the PFC circuit;

the collector of the second photo-coupler is coupled to one terminal of a seventh resistor and one terminal of an eighth resistor; the other terminal of the seventh resistor is coupled to the first output terminal of the flyback converter; the other terminal of the eighth resistor is coupled to a control terminal of the third transistor; an emitter of the second photo-coupler is grounded;

a first terminal of the third transistor is coupled to one terminal of the ninth resistor; the other terminal of the ninth resistor is coupled to the first output terminal of the flyback converter; a second terminal of the third transistor is coupled to the LLC resonant converter;

the collecting circuit is configured to collect the voltage applied on the voltage output terminal of the PFC circuit to the reference terminal of the controllable voltage supplier.

2. The power supplying circuit of claim 1, wherein the PFC controller further comprises a third capacitor; one terminal of the third capacitor is coupled to the PFC circuit; the other terminal of the third capacitor is grounded.

3. The power supplying circuit of claim 2, wherein the first transistor and the second transistor are NPN transistors; a first terminal, a second terminal, and a control terminal of the first transistor are a collector, an emitter, and a base, respectively; a first terminal, a second terminal, and a control terminal of the second transistor are a collector, an emitter, and a base, respectively.

4. The power supplying circuit of claim 1, wherein the third transistor is a PNP transistor; a first terminal, a second terminal, and a control terminal of the third transistor are an emitter, a collector, and a base, respectively.

5. The power supplying circuit of claim 4, wherein the collecting circuit comprises: a tenth resistor, an eleventh resistor, and a twelfth resistor;

one terminal of the tenth resistor is coupled to the voltage output terminal of the PFC circuit; the other terminal of the tenth resistor is coupled to one terminal of the eleventh resistor; the other terminal of the eleventh resistor and one terminal of the twelfth resistor are coupled to the reference terminal of the controllable voltage supplier; the other terminal of the twelfth resistor is grounded.

6. The power supplying circuit of claim 5, wherein the LLC resonant controller further comprises a sixth capacitor; one terminal of the sixth capacitor is coupled to the reference terminal of the controllable voltage supplier; the other terminal of the sixth capacitor is grounded.

7. The power supplying circuit of claim 4, wherein the collecting circuit comprises: a thirteenth resistor, a fourteenth resistor, and a fifteenth resistor, a second diode, a third diode, a fourth capacitor, and a fifth capacitor;

one terminal of the thirteenth resistor is coupled to the voltage output terminal of the PFC circuit; the other terminal of the thirteenth resistor is coupled to one terminal of the fourth capacitor; the other terminal of the fourth capacitor and an anode of the second diode are coupled to a cathode of the third diode;

a cathode of the second diode is coupled to one terminal of the fifth capacitor and one terminal of the fourteenth resistor; an anode of the third diode and the other terminal of the fifth capacitor are grounded;

the other terminal of the fourteenth resistor and one terminal of the fifteenth resistor are coupled to the reference terminal of the controllable voltage supplier; the other terminal of the fifteenth resistor is grounded.

8. A power supplying circuit, comprising a rectifier, a flyback converter, a power factor correction circuit, an LLC resonant converter, a power factor correction (PFC) controller, and a LLC resonant controller, wherein a first input terminal and a second input terminal of the power factor correction controller connect to a first output terminal and second terminal of the flyback converter, respectively, and an output terminal of the power factor correction controller connects to a first input terminal of the LLC resonant controller and the PFC circuit;

a second input terminal of the LLC resonant controller is connected to a first output terminal of the flyback converter, an output terminal of the LLC resonant controller is coupled to the LLC resonant converter, a collecting terminal of the LLC resonant controller is coupled to an output terminal of the PFC controller;

the PFC controller is configured to supply a first operating voltage to a PFC circuit; the LLC resonant controller is configured to supply a second operating voltage to the LLC resonant converter upon a condition that a voltage applied on the output terminal of the PFC circuit reaches a predetermined voltage, wherein the PFC controller comprises a first photo-coupler, a first transistor, a second transistor, a control signal processing circuit, a voltage divider, and a clamping circuit;

an anode of the first photo-coupler is coupled to the first output terminal of the flyback converter; a cathode of the first photo-coupler is coupled to a first terminal of the first transistor; a second terminal of the first transistor is grounded; a control terminal of the first transistor is coupled to the control signal processing circuit;

a collector of the first photo-coupler is coupled to a second terminal of the flyback converter; an emitter of the first photo-coupler is coupled to a control terminal of the second transistor and the clamping circuit through the voltage divider;

a first terminal of the second transistor is coupled to the second terminal of the flyback converter; a second terminal of the second transistor is coupled to the PFC circuit and the first input terminal of the LLC resonant controller;

the control signal processing circuit comprises a first resistor, a second resistor, and a first capacitor; one terminal of the first resistor is coupled to a control signal source; the other terminal of the first resistor is coupled to one terminal of the second resistor, one terminal of the first capacitor, and the control terminal of the first transistor; the other terminal of the second resistor and the other terminal of the first capacitor are grounded;

the voltage divider comprises a third resistor and a fourth resistor; one terminal of the third resistor and one terminal of the fourth resistor are coupled to the emitter of the first photo-coupler; the other terminal of the third resistor is grounded; the other terminal of the fourth resistor is coupled to the control terminal of the second transistor;

the clamping circuit comprises a Zener diode, a first diode, and a second capacitor; one terminal of the Zener diode, one terminal of the second capacitor, and a cathode of the first diode are coupled to the control terminal of the second transistor; the other terminal of the Zener diode and the other terminal of the second capacitor are grounded; an anode of the first diode is coupled to a second terminal of the second transistor.

9. The power supplying circuit of claim 8, wherein the PFC controller further comprises a third capacitor; one terminal of the third capacitor is coupled to the PFC circuit; the other terminal of the third capacitor is grounded.

10. The power supplying circuit of claim 9, wherein the first transistor and the second transistor are NPN transistors; a first terminal, a second terminal, and a control terminal of the first transistor are a collector, an emitter, and a base, respectively; a first terminal, a second terminal, and a control terminal of the second transistor are a collector, an emitter, and a base, respectively.

11. The power supplying circuit of claim 8, wherein the LLC resonant controller comprises a second photo-coupler, a controllable voltage supplier, a third transistor, and a collecting circuit;

an anode of the second photo-coupler is coupled to one terminal of a fifth resistor and one terminal of a sixth resistor; the other terminal of the fifth resistor is coupled to the PFC controller; the other terminal of the sixth resistor is coupled to a cathode of the second photo-coupler and an anode of the controllable voltage supplier; a cathode of the controllable voltage supplier is grounded; a reference terminal of the controllable voltage supplier is coupled to the voltage output terminal of the PFC circuit;

the collector of the second photo-coupler is coupled to one terminal of a seventh resistor and one terminal of an eighth resistor; the other terminal of the seventh resistor is coupled to the first output terminal of the flyback converter; the other terminal of the eighth resistor is coupled to a control terminal of the third transistor; an emitter of the second photo-coupler is grounded;

a first terminal of the third transistor is coupled to one terminal of the ninth resistor; the other terminal of the ninth resistor is coupled to the first output terminal of the flyback converter; a second terminal of the third transistor is coupled to the LLC resonant converter;

the collecting circuit is configured to collect the voltage applied on the voltage output terminal of the PFC circuit to the reference terminal of the controllable voltage supplier.

12. The power supplying circuit of claim 11, wherein the third transistor is a PNP transistor; a first terminal, a second terminal, and a control terminal of the third transistor are an emitter, a collector, and a base, respectively.

13. The power supplying circuit of claim 12, wherein the collecting circuit comprises: a tenth resistor, an eleventh resistor, and a twelfth resistor;

one terminal of the tenth resistor is coupled to the voltage output terminal of the PFC circuit; the other terminal of the tenth resistor is coupled to one terminal of the eleventh resistor; the other terminal of the eleventh resistor and one terminal of the twelfth resistor are coupled to the reference terminal of the controllable voltage supplier; the other terminal of the twelfth resistor is grounded.

14. The power supplying circuit of claim 13, wherein the LLC resonant controller further comprises a sixth capacitor; one terminal of the sixth capacitor is coupled to the reference terminal of the controllable voltage supplier; the other terminal of the sixth capacitor is grounded.

15. The power supplying circuit of claim 12, wherein the collecting circuit comprises: a thirteenth resistor, a fourteenth resistor, and a fifteenth resistor, a second diode, a third diode, a fourth capacitor, and a fifth capacitor;

one terminal of the thirteenth resistor is coupled to the voltage output terminal of the PFC circuit; the other terminal of the thirteenth resistor is coupled to one terminal of the fourth capacitor; the other terminal of the fourth capacitor and an anode of the second diode are coupled to a cathode of the third diode;

a cathode of the second diode is coupled to one terminal of the fifth capacitor and one terminal of the fourteenth resistor; an anode of the third diode and the other terminal of the fifth capacitor are grounded;

the other terminal of the fourteenth resistor and one terminal of the fifteenth resistor are coupled to the reference terminal of the controllable voltage supplier; the other terminal of the fifteenth resistor is grounded.

16. A liquid crystal display using a power supplying circuit, the power supplying circuit comprising a rectifier, a flyback converter, a power factor correction circuit, an LLC resonant converter, a power factor correction (PFC) controller, and a LLC resonant controller, wherein a first input terminal and a second input terminal of the power factor correction controller connect to a first output terminal and second terminal of the flyback converter, respectively, and an output terminal of the power factor correction controller connects to a first input terminal of the LLC resonant controller and the PFC circuit;

a second input terminal of the LLC resonant controller is connected to a first output terminal of the flyback converter, an output terminal of the LLC resonant controller is coupled to the LLC resonant converter, a collecting terminal of the LLC resonant controller is coupled to an output terminal of the PFC controller;

the PFC controller is configured to supply a first operating voltage to a PFC circuit; the LLC resonant controller is configured to supply a second operating voltage to the LLC resonant converter upon a condition that a voltage applied on the output terminal of the PFC circuit reaches a predetermined voltage, wherein the PFC controller comprises a first photo-coupler, a first transistor, a second transistor, a control signal processing circuit, a voltage divider, and a clamping circuit;

an anode of the first photo-coupler is coupled to the first output terminal of the flyback converter; a cathode of the first photo-coupler is coupled to a first terminal of the first transistor; a second terminal of the first transistor is grounded; a control terminal of the first transistor is coupled to the control signal processing circuit;

a collector of the first photo-coupler is coupled to a second terminal of the flyback converter; an emitter of the first photo-coupler is coupled to a control terminal of the second transistor and the clamping circuit through the voltage divider;

a first terminal of the second transistor is coupled to the second terminal of the flyback converter; a second terminal of the second transistor is coupled to the PFC circuit and the first input terminal of the LLC resonant controller;

the control signal processing circuit comprises a first resistor, a second resistor, and a first capacitor; one terminal of the first resistor is coupled to a control signal source; the other terminal of the first resistor is coupled to one terminal of the second resistor, one terminal of the first capacitor, and the control terminal of the first transistor; the other terminal of the second resistor and the other terminal of the first capacitor are grounded;

the voltage divider comprises a third resistor and a fourth resistor; one terminal of the third resistor and one terminal of the fourth resistor are coupled to the emitter of the first photo-coupler; the other terminal of the third resistor is grounded; the other terminal of the fourth resistor is coupled to the control terminal of the second transistor;

the clamping circuit comprises a Zener diode, a first diode, and a second capacitor; one terminal of the Zener diode, one terminal of the second capacitor, and a cathode of the first diode are coupled to the control terminal of the second transistor; the other terminal of the Zener diode and the other terminal of the second capacitor are grounded; an anode of the first diode is coupled to a second terminal of the second transistor.

17. The liquid crystal display of claim 16, wherein the LLC resonant controller comprises a second photo-coupler, a controllable voltage supplier, a third transistor, and a collecting circuit;

an anode of the second photo-coupler is coupled to one terminal of a fifth resistor and one terminal of a sixth resistor; the other terminal of the fifth resistor is coupled to the PFC controller; the other terminal of the sixth resistor is coupled to a cathode of the second photo-coupler and an anode of the controllable voltage supplier; a cathode of the controllable voltage supplier is grounded; a reference terminal of the controllable voltage supplier is coupled to the voltage output terminal of the PFC circuit;

the collector of the second photo-coupler is coupled to one terminal of a seventh resistor and one terminal of an eighth resistor; the other terminal of the seventh resistor is coupled to the first output terminal of the flyback converter; the other terminal of the eighth resistor is coupled to a control terminal of the third transistor; an emitter of the second photo-coupler is grounded;

a first terminal of the third transistor is coupled to one terminal of the ninth resistor; the other terminal of the ninth resistor is coupled to the first output terminal of the flyback converter; a second terminal of the third transistor is coupled to the LLC resonant converter;

the collecting circuit is configured to collect the voltage applied on the voltage output terminal of the PFC circuit to the reference terminal of the controllable voltage supplier.

18. The liquid crystal display of claim 17, wherein the third transistor is a PNP transistor; a first terminal, a second terminal, and a control terminal of the third transistor are an emitter, a collector, and a base, respectively.

* * * * *